July 26, 1927.
O. STENZEL
1,636,928
VEHICLE LIGHT LENS
Filed April 24, 1926
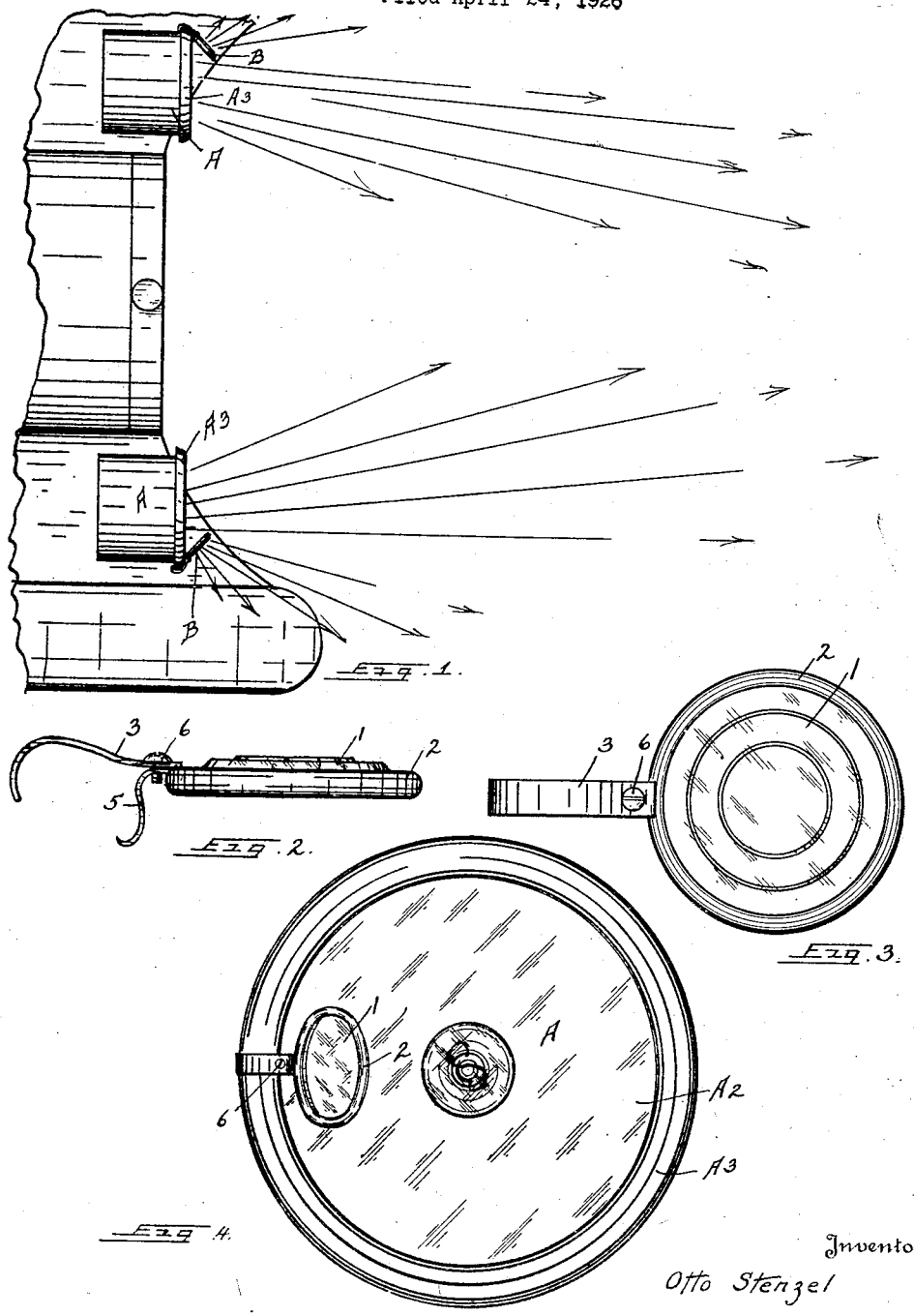
Inventor
Otto Stenzel
By R. M. Thomas
Attorney Patented July 26, 1927.

1,636,928

UNITED STATES PATENT OFFICE.

OTTO STENZEL, OF SALT LAKE CITY, UTAH.

VEHICLE LIGHT LENS.

Application filed April 24, 1926. Serial No. 104,296.

My invention relates to automobiles and has for its object to provide a new and efficient lens for use in connection with the regular automobile head lamps.

A further object is to provide a danger lens to be used on the most projecting portion of the vehicle and whereby the rays of the conventional lights warn other approaching vehicles or pedestrians.

These objects I accomplish with the device illustrated in the accompanying drawings in which similar letters and numerals of reference indicate like parts throughout the several views and described in the specification forming a part of this application and pointed out in the appended claim.

In the drawing of which I have shown the best and most substantial embodiment of my invention. Figure 1 is a plan view of the front part of an automobile showing my device in place on the headlights. Figure 2 is an edge elevation of the device detached. Figure 3 is a plan of the same. Figure 4 is a front view of the device in place on a headlight.

In making novelty and safety lights it has long been the practice to have side lights on the running board of the automobile as a safety light. Some lights have been placed up on the sides of the cars; parking lights and others have danger lights attached to the motometer or the closure cap for the radiators. All of those lights require additional wiring and use additional electricity. Most of such lights use a red lens on the left side of the vehicle and a green one on the right. With my device the expense of additional wiring, extra lamps and the use of more electricity are eliminated, as the only lights used are the conventional headlights, with no additional wiring or extra lights.

In the drawing I have shown the commonly used headlamps of the automobile as A, to which my additional lens B is secured. I provide a plate of colored glass 1 which is mounted in an annular frame 2. An extended lug 3 is provided on one side of said frame 2 and is flattened and given a wedge shape at the extreme end. A hole is bored and threaded through said lug 3 near the edge of the frame 2, and an S-shaped clamp member 5 is detachably secured to said lug 3 by a bolt 6 threaded into a hole bored in the end of the clamp 6 and into the hole of the lug 3. To mount the lens on the common headlight, the tapered end of the lug 3 is pressed between the glass $A^2$ and the frame $A^3$ which holds the glass. The clamp member 5 may then be bent to conform with the frame of the headlight and the bolt 6 secured into the holes in the bracket 5 and lug 3 clamping them together and securing the lens to the headlight frame $A^2$. The lug 3 and the clamp 5 are so shaped and bent that when attached to the headlight of the automobile the lens 1 is at an acute angle to the main lens $A^2$ or glass in the headlight, preferably at forty-five degrees.

It will be obvious that any minor changes and modifications, such as welding the lug 3 to the headlight frame, may be used within the scope of the invention.

When my device is in place on the headlights of an automobile, the rays of the main or driving light will pass the smaller lens B and it will not be noticed or visible to the driver of an approaching vehicle or pedestrian. When the automobile or approaching vehicle is near, the rays of light from the headlight lamps A will pass through the small lens 1 and show a colored danger signal to those approaching. The lens 1 will be colored red on the left lamp and green on the right lamp.

Having thus described my invention I desire to secure by Letters Patent and claim:—

In a safety light for vehicles, the combination of a headight; a frame on said headlight; another smaller frame to be secured to said first mentioned frame at an angle of forty-five degrees to the front of said frame; a colored lens carried in said second mentioned frame; a lug on said second mentioned frame; a clamp on the end of said lug and a screw to clamp said lug and clamp to said headlight frame.

In testimony whereof I have affixed my signature.

OTTO STENZEL.